United States Patent [19]
Bühl et al.

[11] 3,940,579
[45] Feb. 24, 1976

[54] PLURAL SWITCH CONSTRUCTION HAVING ROTARY AND LINEAR SWITCH CONTACT ASSEMBLIES OPERATED BY INDEPENDENT OPERATORS

[75] Inventors: Harro Bühl, Kirchheim; Herbert Erdelitsch, Bietigheim; Otto Machalitzky, Pleidelsheim; Wolf Seitter, Marbach (Neckar), all of Germany

[73] Assignee: SWF-Spezialfabrik fur Autozubehor Gustav Rau GmbH, Germany

[22] Filed: July 16, 1974

[21] Appl. No.: 488,984

[30] Foreign Application Priority Data
July 16, 1973   Germany............................ 2336064

[52] U.S. Cl. ............... 200/4; 200/61.27; 200/61.54
[51] Int. Cl.² ....................... H01H 9/00; H01H 3/16
[58] Field of Search ................. 200/4, 61.27–61.38, 200/61.54–61.57, 61.85; 340/52 R, 54–57, 66, 73

[56] References Cited
UNITED STATES PATENTS

| | | | |
|---|---|---|---|
| 3,200,212 | 8/1965 | Barcus et al. | 200/61.34 |
| 3,334,201 | 8/1967 | Mutschler et al. | 200/61.54 X |
| 3,476,896 | 11/1969 | Schreiber | 200/61.54 |
| 3,604,975 | 9/1971 | Suzuki et al. | 200/61.54 X |
| 3,745,524 | 7/1973 | Suzuki | 200/61.27 X |
| 3,881,076 | 4/1975 | Latka et al. | 200/61.54 |
| 3,892,932 | 7/1975 | Erdelitsch et al. | 200/61.27 |

FOREIGN PATENTS OR APPLICATIONS
1,553,164   12/1968   France............................. 200/61.54

*Primary Examiner*—James R. Scott
*Attorney, Agent, or Firm*—McGlew and Tuttle

[57] ABSTRACT

A switch particularly for steering columns of automobiles for the selective operation of both light circuits and windshield wiper and washer circuits comprises a U-shaped spring contact having a first spring contact portion in a first plane and a second spring contact portion in a second plane. The switch includes a lever which is pivotal in both the first and second planes and which carries a rod member which may be engaged with the spring first portion to deflect it into engagement with a fixed contact for example for actuating a windshield wiper washer fluid supply circuit and which may be engaged during its pivotal movement for example in a vertical direction to move the spring second portion to engage a fixed contact which for example may operate a by-pass light circuit. The double spring contact actually includes the first spring portion which extends substantially vertical and at right angles to a horizontal portion. The switching lever is hollow and the rod portion is displaceable therein under a button control to engage one of the several spring contact portions.

6 Claims, 3 Drawing Figures

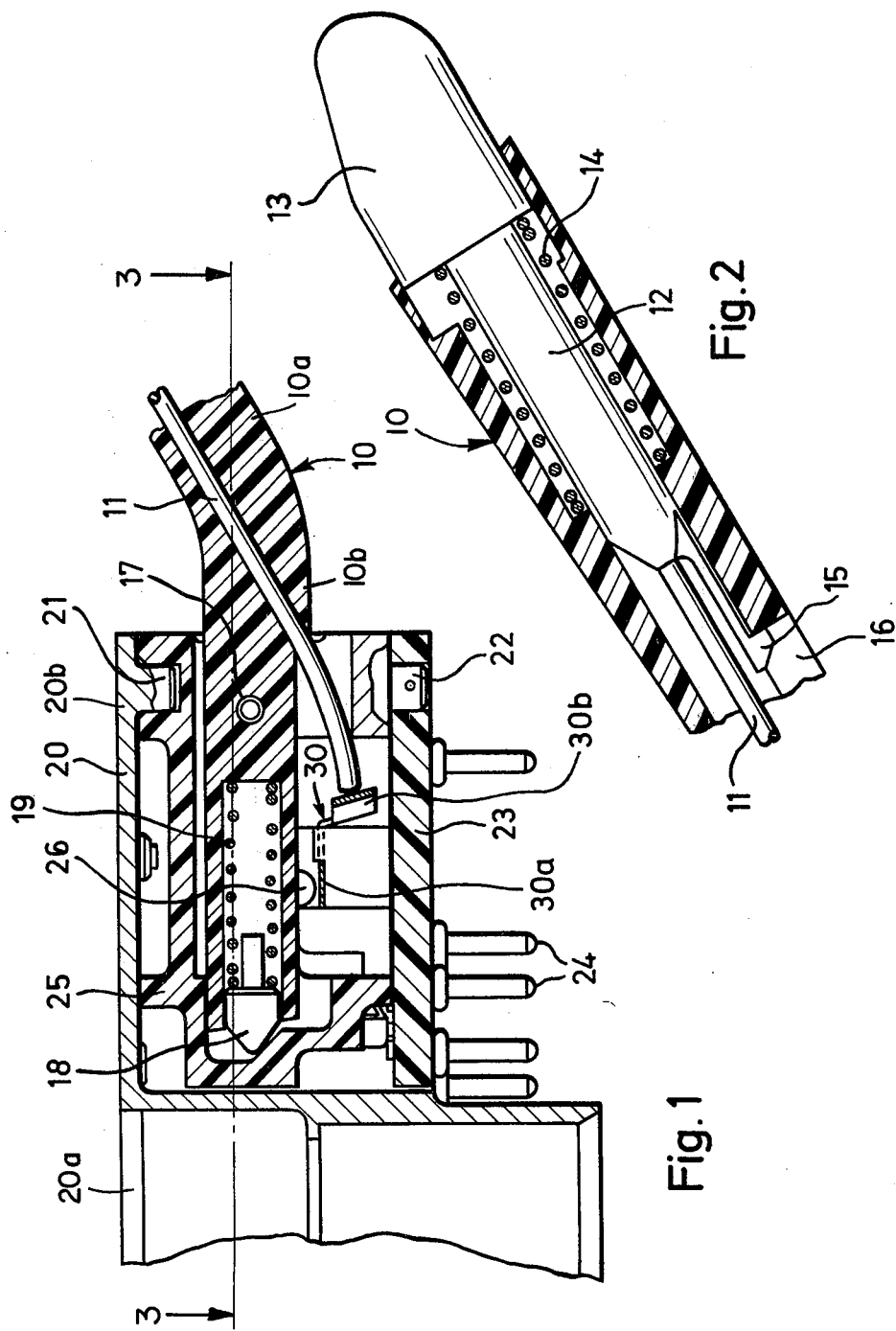

PLURAL SWITCH CONSTRUCTION HAVING ROTARY AND LINEAR SWITCH CONTACT ASSEMBLIES OPERATED BY INDEPENDENT OPERATORS

BACKGROUND OF THE INVENTION

1. Field of the Invention

This invention relates in general to the construction of switches and in particular to a new and useful switch which is adapted to be mounted on a steering column of an automobile and which may be used for selectively actuating one or more vehicle operating circuits.

2. Description of the Prior Art

The known steering column switches are preferably used as either wiper and washer fluid operating switches in an automobile vehicle in order to control the windshield wiper and windshield washing fluid installation. The switching lever of such a steering column switch carries a driver and a switching member when it is moved in a horizontal direction and a switching member cooperates with contacts fixed to the housing in the various switching positions to effect the switching connections for the windshield wiper installation. The additional switching arrangement is actuated when the switching lever is moved in a vertical direction and serves for actuating the by-pass light signals. An additional switch is provided for the control of the windshield washing fluid or an additional switch arrangement is located in the steering column switch housing and this can be controlled by means of a switching rod which is axially displaceable in the switching lever. Such a further switching arrangement for the control of the windshield washing installation is located at the end of the switching lever and therefore impairs the movement of the driver or the switching member.

SUMMARY OF THE INVENTION

In accordance with the invention there is provided a steering column switch which includes a pivotal lever which cooperates with a double spring contact and which includes a displaceable switching rod which may be displaced axially within the lever for the control of the switching movement. With the inventive arrangement the contact comprises a double contact spring having one contact portion in one plane and another in another plane so that they may be selectively operated by pivotal movement of the lever in one or both planes. The lever is mounted so that its pivotal movement may be accomplished without hindrance of the displacement movement of the driver or the switching member. This is possible because of the use of the U-shaped double spring contact which includes a first spring portion which is movable by means of the switching rim of the switching lever and a second spring portion which extends in a different plane from the first spring portion and which is operable by means of a switching rod axially displaceable inside the switching lever. For this purpose the end of the switching rod is brought out of the switching lever at the lower side of the switching lever. With this design only a movable double spring contact is necessary and this can be easily arranged below the driver or the switching member and can be actuated by movement of the switching lever in a vertical direction or by the axial displacement of the switching rod in the switching lever. The double spring contact is used advantageously for the control of two separate contacts with the same control potential. A feature of the construction is that a single connection for the double spring may be made to each spring portion so that it forms a terminal contact for both spring portions.

In order to insure that additional switch circuits may be controlled independently from the position of the switching lever when it is moved in a horizontal switching plane one of the spring portions is arranged to extend in a vertical plane with its broad side nearly vertical to the longitudinal axis of the switching rod carried by the lever and with its longitudinal axis located in the horizontal switching plane of the switching lever. The coupling between the double spring contact located under the driver of the switch or under the switching lever is achieved by arranging the switching lever in the switch housing so that it is bent away from the longitudinal axis of the part which projects from the switch housing and a switching rod is axially guidable in the part which projects from the remaining portion of the lever which is brought out of the housing. For this purpose the lever is made as an angle member with an outer portion defining a guideway for the rod so that the rod extends below the inner portion of the lever and may be easily positioned to contact the switch portion which is disposed in a vertical plane. The outer end of the rod is provided with a push button which is biased by a spring to a position in which the rod is in an off position. A locking element carried by the lever may be displaced by overcoming the biasing pressure of a locking spring.

Accordingly it is an object of the invention to provide a new improved switch construction which includes a U-shaped spring contact having a first portion which is disposed in a first plane and a second portion disposed in a second distinct plane wherein a switching lever cooperates with the spring may displace a first portion in its plane for actuating a first electrical device or an associated actuating rod portion may displace a second spring contact portion for operating another device.

A further object of the invention is to provide a switch for mounting on a steering column of an automobile which includes a pivotal lever portion which is pivotal both in horizontal and vertical directions and which carries an axially movable rod member, the lever being displaceable against a first portion of a U-shaped spring contact to move it into engagement with a fixed contact arranged in spaced relationship therefrom in order to actuate a first circuit and carrying a rod member which is displaceable axially in respect to the lever to displace a second spring contact portion into association with a second contact for actuating a second circuit.

A further object of the invention is to provide a spring contact switch construction which is simple in design, rugged in construction and economical to manufacture.

For an understanding of the principles of the invention, reference is made to the following description of a typical embodiment thereof as illustrated in the accompanying drawing.

BRIEF DESCRIPTION OF THE DRAWINGS

In the Drawings:

FIG. 1 is a partial vertical sectional view of a steering column and switch housing therefor constructed in accordance with the invention;

FIG. 2 is a view similar to FIG. 1 but of the upper portion of the lever shown in FIG. 1.

GENERAL DESCRIPTION OF THE PREFERRED EMBODIMENT

Figure 3:
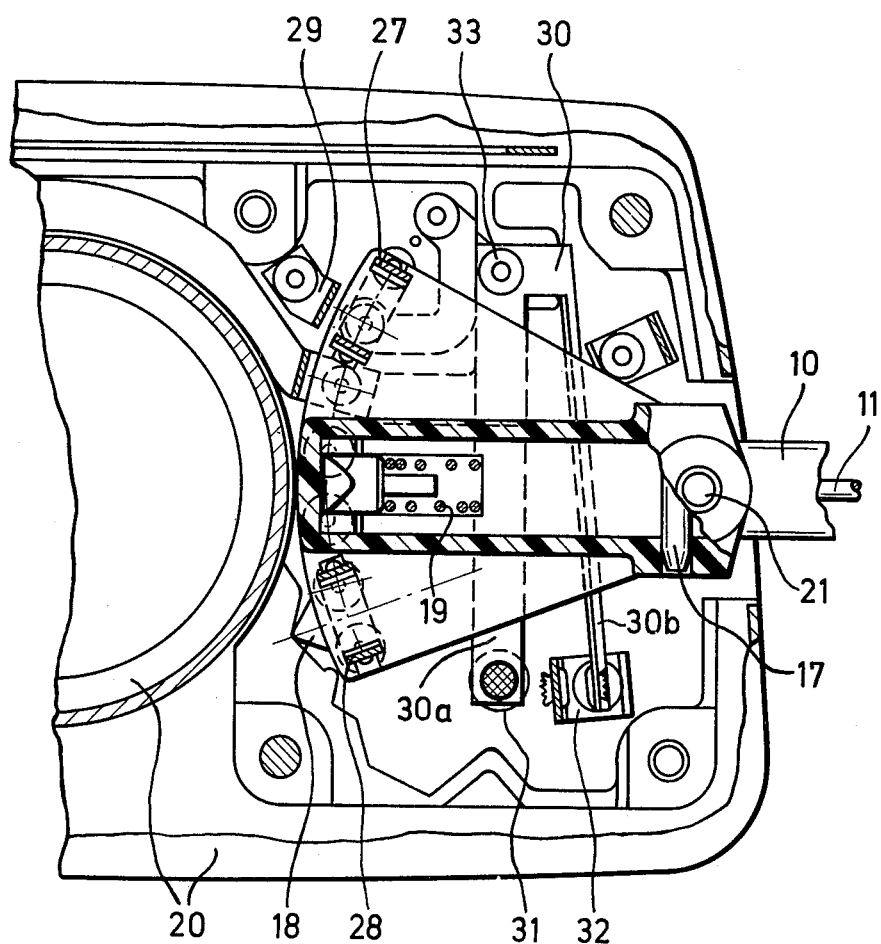
FIG. 3 is a section taken along the line 3—3 of FIG. 1.

Referring to the drawings in particular the invention embodied therein comprises a steering column switch including a bracket housing 20 having a bore 20a for accommodating a steering column and supporting a switch base plate 23. The base plate 23 is located below an extension 20a of the bracket housing to form a receiving chamber or housing for a switching lever generally designated 10. A hollow driver 25 surrounds the inner end of the lever 10 and provides a means for its pivotal support on bearings 21 and 22 at diametrically opposite locations on the housing part 20a and switch plate 20 respectively. The bearings 21 and 22 support the lever 10 and the driver 25 for horizontal shifting movement. In addition the lever 10 is pivotable in a vertical plane about a pivot pin 17. During the horizontal displacement of the lever 10 and driver 25 contact blocks 27 and 28 carried by the driver are shifted in respect to various terminals 29 which are spaced laterally on the base plate 23 and which are connected through external terminals 24 to various operating circuits for example light or other similar vehicle operating circuits. Such circuits may for example comprise left and right signal turn lighting circuits which will operate in dependence upon in which direction the lever 10 is shifted.

In accordance with the invention the lever 10 may also be shifted about a horizontal pivot 17 so as to move in a vertical direction within the driver 25 and during this movement a locking bolt 18 is displaced against the force of a compression spring 19 as the outer end of the locking bolt rides over an inner camming surface of the driver 25. The camming surfaces of the driver 25 are such that by the action of the spring 19 the lever 10 is urged into a neutral or off position shown in FIG. 1.

In accordance with a feature of the invention a double spring contact generally designated 30 is mounted on the contact plate 23 and it includes a first arm portion 30a which is disposed flat in a horizontal plane and overlies a contact 31 which for example actuates a by-pass light circuit and a second arm portion 30b which is disposed in a vertical plane or normal to the plane of the first portion 30a. The second contact arm portion 30b is arranged in spaced location to a contact 32 which is provided for actuating another circuit for example for actuating a washer pump for the discharge of windshield wiper washer fluid. The spring contact 30 is mounted on the plate by means of a contact terminal 33 which forms a common contact terminal for both leg portions or arm portions 30a or 30b. The spring 30 is shown in particular detail in FIG. 3 and it may be adjusted in a horizontal switching plane and is located under a switching rim 26 of the switching lever 10. When the switching lever 10 is moved so that it pivots about the axis 17 the switching rim 26 deflects the spring leg at 30a into engagement with the contact 31.

The spring arm 30b of the double spring contact 30 may also be adjusted in a horizontal switching plane of the switching lever 10 and its broad side is located approximately vertical to the switching plane. The lever 10 is angled and includes an offset upper or outer portion 10a arranged at an angle to a normally horizontal portion 10b. The upper portion is provided with a bore which accommodates a switching rod 11. The switching rod 11 is axially slidable in the bore of the lever 10 and its lower end extends outwardly from the lever and may be engaged with the spring arm 30b to shift this arm into engagement with the contact 32 when desired. For this purpose the outer or upper end of the rod 11 carries a push button 13 which is biased outwardly by a spring 14 to position the rod 11 in a non-actuated position. The switching rod 11 may be secured in the lever 10 by a locking element 15 of a guide section or widened section 12 at the outer end thereof. The guiding section 12 may be locked in a recess 16 of the switching lever 10 and the end of the recess limits the axial displacement of the switching rod 11 in the lever at least in the switching off position as shown in FIG. 2. When the push button 13 is displaced manually the free end of the switching rod projects further from the switching lever 10 and displaces the spring 30b into engagement with the stationary contact 32 which is fixed on the plate 23. This switching connection is advantageously used for another auxiliary circuit for example for actuating the washing fluid pump for the windshield wiper. As best seen in FIG. 3 it is obvious that the switching to actuate the arm 30b to contact the contact 32 can be effected in each horizontal position of the switching lever 10. The common control potential for the two springs 30a and 30b is supplied via the terminal 33 which is located between the arms 30a and 30b of the double spring contact 30.

While a specific embodiment of the invention has been shown and described in detail to illustrate the application of the principles of the invention it will be understood that the invention may be embodied otherwise without departing from such principles.

What is claimed is:

1. A switch, comprising a housing, a U-shaped spring contact in said housing having a first spring contact portion in a first plane and a second spring contact portion in a second plane disposed at an angle from said first plane, a switch lever, means disposed on and within said housing pivotally supporting said switch lever for pivotal movement in said first plane and said second plane, a first contact spaced from said first spring contact portion for operating a first operating circuit, a second contact spaced from said second spring contact portion for operating a second operating circuit, and a switching rod carried on said lever and being movable relatively thereto, said rod being displaceable independently of the pivotal position of said lever and having a rod portion engageable with said second spring contact portion to move it into engagement with said second contact and to permit disengagement therefrom, said lever being pivotal at least in one direction and having a lever portion engageable with said first spring contact portion to move it into engagement with and permit its disengagement from said first contact.

2. A switch according to claim 1, including a contact terminal mounted on said housing and connected to said spring contact between said first and second contact portions.

3. A switch according to claim 1, wherein said first spring contact portion is located in a substantially horizontal plane, said switch lever being pivotal to move a portion thereof through said plane to engage said first spring contact portion, said second spring contact portion being disposed in a substantially vertical plane with its longitudinal axis located in the horizontal switching plane of the switching lever.

4. A switch according to claim 1, wherein said lever comprises an angle shape lever having an offset outer end, said offset outer end having a bore, said switching rod being slidable in said bore and projecting outwardly at the lower end thereof adjacent the other portion of said lever in a position to be displaced to engage said second spring contact portion.

5. A switch according to claim 4, wherein said rod portion comprises one end of said switching rod, said rod having an opposite outer end with a push button thereon projecting outwardly from said lever, means biasing said lever to an off position, said push button being deflectable to deflect said switching rod to engage said second spring contact portion.

6. A switch according to claim 1, wherein said means pivotally supporting said switch lever includes a first set of pivotal bearings for pivoting said switching lever about a substantially horizontal axis so as to move the switching lever through a vertical plane, and a second set of bearings for pivoting the switching lever for movement about a vertical axis, said lever portion comprising a driver surrounding an end of said switching lever at a spaced location from said pivots having driver contact means thereon, said lever being shiftable in a horizontal plane to move said driver to move said contact, said housing having a plurality of stationary contacts arranged in the path of horizontal movement of said driver contact means for selective engagement therewith, said first spring contact portion comprising a spring disposed flat in a horizontal plane below said lever in a position to be moved by movement of said lever through a vertical plane, said second spring contact being disposed in a vertical plane being movable by displacement of said switching rod relative to said switching lever.

* * * * *